United States Patent [19]
Jünemann

[11] Patent Number: 5,425,200
[45] Date of Patent: Jun. 20, 1995

[54] GATHERED PLANTING NET

[75] Inventor: Ulrich Jünemann, Kassel, Germany

[73] Assignee: HaCe-Neuzeitliche Verpackungstechnik GmbH & Co. KG., Witzenhausen-Kleinalmerode, Germany

[21] Appl. No.: 183,163

[22] Filed: Jan. 18, 1994

[30] Foreign Application Priority Data

Jan. 22, 1993 [EP] European Pat. Off. ........ 93100941.9

[51] Int. Cl.⁶ ................................................ A01C 1/04
[52] U.S. Cl. ............................................................ 47/56
[58] Field of Search ................................ 47/56, 1.01

[56] References Cited

U.S. PATENT DOCUMENTS

| | | | |
|---|---|---|---|
| 3,845,584 | 11/1974 | Mercer | 47/56 |
| 3,877,633 | 4/1975 | Peck et al. | 47/56 |
| 5,101,594 | 4/1992 | Ahm | 47/56 |
| 5,210,975 | 5/1993 | Beckerman | 47/56 |

FOREIGN PATENT DOCUMENTS

| | | |
|---|---|---|
| 1147782 | 11/1957 | France. |
| 2505607 | 11/1982 | France ................ 47/56 |
| 2592007 | 6/1987 | France. |
| 3804357 | 9/1988 | Germany ............ 47/56 |
| 0114713 | 9/1980 | Japan .................. 47/56 |
| 0173211 | 9/1985 | Japan .................. 47/56 |
| 5268831 | 10/1993 | Japan .................. 47/56 |
| 9100478 | 10/1992 | Netherlands. |
| 456592 | 3/1975 | U.S.S.R. ............. 47/77 |

*Primary Examiner*—Michael Powell Buiz
*Assistant Examiner*—Joanne C. Downs
*Attorney, Agent, or Firm*—Price, Gess, Ubell

[57] ABSTRACT

A gathered planting net for the cultivation of flower bulbs, especially tulips, narcissi and such, has a carrier lying flat in the transport state and a tubular net provided thereon. The tubular net is held on the carrier with at least one closing band, where the closing band penetrates the interior of the tubular net and of the carrier in the direction of an axis of the tubular net and also extends over the outside of the tubular net. The carrier includes a ring-shaped cutting of cardboard, carton or the like. It has folds parallel to the direction of the axis of the tubular net for the defined setting up of the carrier with the tubular net provided thereon and for mounting the carrier in the opened state onto the net carrier of the planting machine.

13 Claims, 1 Drawing Sheet

GATHERED PLANTING NET

BACKGROUND THE INVENTION

The invention relates to a gathered planting net for the cultivation of flower bulbs, especially tulips, narcissi and the like, with a carrier lying flat in the transport state and a tubular net provided thereon, which is held on the carrier with at least one closing band. In the gathered planting net of the present invention, the closing band penetrates the interior of the tubular net and of the carrier in the direction of an axis of the tubular net and also extends over the outside of the tubular net.

For the cultivation of flower bulbs, especially tulips, narcissi, irises and the like, it is well known to put the bulbs into the earth for their cultivation, or more specifically, their reproduction. After a certain growth period the flower is cut off, so that the bulb will grow stronger or reproduce through the formation of neighboring bulbs during the extended growth period.

For putting the bulbs into the earth it is known to use a planting net, the main component of which is a tubular net, which may especially consist of double ribbed material and which may have a length of up to 400 m. This tubular net is gathered shortened in an axial direction and then put onto a flat-lying carrier by the manufacturer of the tubular net. Two pieces of identically, e.g., rectangularly, shaped cardboard lying flat on top of each other may then be used to serve as the carrier. After the gathered net is put onto the carrier, each piece of cardboard is enclosed by a closing band in a manner such that the piece of cardboard and the outer part of the tubular net are surrounded by the closing band. These closing bands are sometimes called sleeves. They usually comprise a piece of plastic foil which itself has been brought to a ring shape by connecting its two ends. It is in this fixed state, lying flat and held tight by the closing bands, that the planting net is supplied by the manufacturer to the user for the cultivation of the flower bulbs. When putting the flower bulbs into the earth, it is at first necessary to put the planting net onto a net carrier of a planting machine. One known tubular net has a circumference of approximately 1.6 m, so that the carrier has a width of 0.8 m. After the removal of the closing bands the two pieces of cardboard of the carrier are widened in an archlike fashion and the planting net is put onto the net carrier of the planting machine in this state.

The handling properties of the known planting nets are not satisfactory. In particular, it is very tedious to properly and correctly fit the planting net onto the net carrier of the planting machine. These difficulties may best be demonstrated by the fact that putting the known planting net onto the net carrier of the planting machine takes as much time as the subsequent planting of the flower bulbs using up the tubular net, even when employing skilled workers. Approximately fifty percent of the working time is therefore required for the setup of each tubular net.

Following the mounting of the tubular net, or more specifically, the planting net on the net carrier of the planting machine is the actual distribution of the flower bulbs. The flower bulbs are put into the interior of the tubular net during its delivery from the net carrier. The tubular net that has been put into the ground is then covered with soil. The plants grow from the flower bulbs through the tubular net during the subsequent growth period, also penetrating the cover of soil. At the end of the growth period during the harvest of the flower bulbs, the cover of soil is removed first and then the tubular net with the flower bulbs contained therein is pulled from the ground and taken up by a drivable harvesting machine.

During this step, the tubular net is slit open parallel to the direction of its axis, and the flower bulbs are removed from the now accessible interior of the tubular net, cleaned, and deposited into containers. The further steps of sorting, packaging, and delivery of the flower bulbs to the user are well known in the art and will not be described in greater detail.

Another known prior art planting net also uses a carrier comprising two parallel pieces of cardboard that are not connected to each other. Two pieces of string are provided to form one closing band.

The handling of this planting net is relatively even more difficult than that of the above-described net, since the tubular net bulges between the strings, thereby complicating the mounting of the tubular net onto the net carrier of the planting machine even further.

Planting nets that do without carriers altogether and which are merely provided with two sleeves or closing bands to keep the tubular net gathered in the way described above are also known.

Since the known planting nets only have a width of approximately 0.8 m, intermediate strips, in which no flower bulbs grow, are created between the strips of the nets laid in the ground, thereby limiting the efficiency of this form of cultivation. The use of wider planting nets could improve efficiency, but the net handling, especially the mounting onto the net carrier of the planting machine, would be even less satisfactory.

SUMMARY OF THE INVENTION

It is an object of the invention to provide an improved planting net of the type described above which overcomes the disadvantages which plagued the prior art nets so that it may be mounted onto the net carrier of the planting machine comparatively faster and the ratio of set-up time to working time becomes more favorable.

According to the invention, this object is achieved with the planting net of the present invention in that the carrier consists of a ring-shaped cutting (i.e., a length) of cardboard, carton or the like. The cutting is provided with folds parallel to the direction of the axis of the tubular net for setting up the carrier with the tubular net provided thereon and for mounting the carrier in the opened state onto the net carrier of the planting machine. Instead of the indefinite opening of the carrier by elliptical bulging of the two cardboard cuttings, as was previously known, it is now possible for the carrier to not only fulfill a function in the flat lying state, i.e., holding the tubular net during its transport, but also for the carrier and the tubular net thereon to achieve a shape upon opening which corresponds to the shape of the net carrier of the planting machine. Such a planting net can be mounted on the net carrier of a planting machine even by unskilled workers in a comparatively short time. The ratio of set-up time to working time, which was approximately 50 to 50 for prior art nets, is now approximately 10 to 90. When bringing the carrier into the opened state, the areas of the ring-shaped cutting of cardboard, carton or the like are dependably supported by each other, and an indefinite setting-up is avoided. The carrier is bent only in those places that are predetermined by the folds.

The folds themselves may be distributed over the circumference of the ring-shaped cutting so that a rectangular shape is obtained when opening the carrier and the tubular net. Such a distribution is desirable if the net carrier of the planting machine has just this rectangular shape. The rectangular shape is preferred because it preshapes the two larger areas of the tubular net, which are then put into the soil parallel to the ground.

The cutting may also consist of corrugated board. In this case, the direction of the flute should still be arranged parallel to the direction of the axis of the tubular net. Expressed differently, the channels formed by the corrugated material of the corrugated board extend perpendicular to the direction of the axis of the tubular net. This assures that especially the larger areas of the carrier have the required stability in a direction perpendicular to the direction of the axis of the tubular net and avoids unwanted bending of the larger areas. Here, the direction of the flute is understood to be the direction in which the corrugated board leaves the corrugation machine. In the area between two neighboring folds, the ring-shaped cutting may be provided with two layers or with inserts. In its simplest embodiment, the carrier is formed from a continuous cutting, the two ends of which are connected to each other. It is easily possible to fashion the cutting in a way so that the material of the carrier is a double layer at the connection, which on the one hand serves to connect the ends of the ring-shaped cutting, and on the other serves to fortify one of the smaller areas. For a symmetrical formation it is then useful to provide the other smaller area with an insert, in order to also obtain a double layer of material.

An important advantage of the planting net according to the invention is the fact that larger widths of the net up to a width of approximately 1.6 m, corresponding to a circumference of 3.2 m, are possible, so that the flower bulbs can be laid out in a comparatively wide continuous planting strip. Even these wide planting nets are easily handled and set up on the net carrier of a planting machine. For these very wide planting nets it is advantageous to sectionally provide the free edges of the ring-shaped cutting with reinforcements. These reinforcements serve to improve the stability of the larger areas of the carrier against unwanted bending perpendicular to the direction of the axis of the tubular net.

The closing bands usually extend over both a larger and a smaller area of the carrier, so that it is necessary to remove the closing bands from the planting net before setting up the carrier with the tubular net. If the closing bands are arranged parallel to the larger area of the rectangular shape only, they add to the stability of the larger areas and aid in the setup of the net. It then becomes possible to open or remove the closing bands after putting the opened planting net onto the net carrier of the planting machine.

DETAILED DESCRIPTION OF THE PREFERRED EMBODIMENTS

Figure 1:
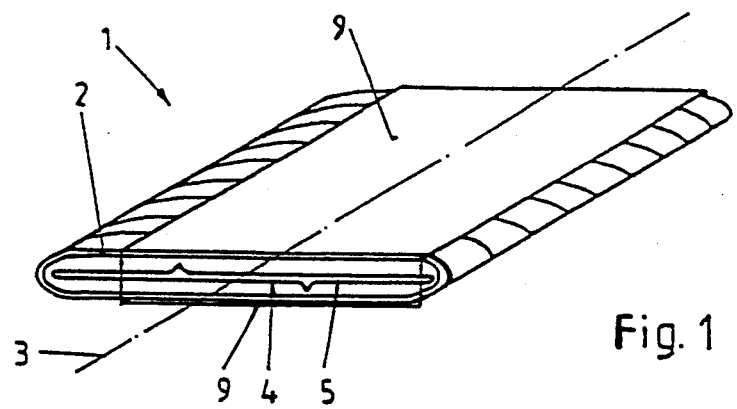
FIG. 1 is a perspective representation of the planting net in the flat lying state.
Figure 2:
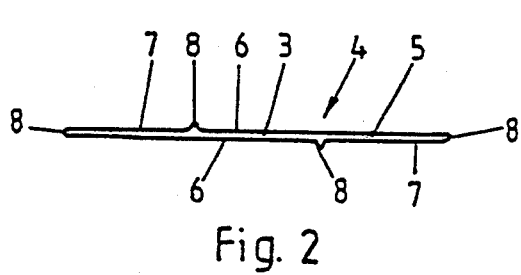
FIG. 2 is a face view of the carrier in the flat lying state.

FIG. 1 shows the planting net 1 in the flat lying transport state. An important component of the planting net 1 is a tubular net 2 with an axis 3. The tubular net 2 is gathered together in the form of a flat lying ring in the direction of the axis 3. Inside the tubular net 2 there is a carrier 4, which comprises a ring-shaped continuous cutting (or length of material) 5 (FIG. 2). The cutting 5 has two larger areas 6 and two smaller areas 7 alternately connected to each other, which are delimited by folds 8, which are parallel to the axis 3. As can be seen from FIG. 3, the carrier can be opened to a rectangular shape, thereby forming a passage in the direction of the axis 3. The tubular net is not shown in FIGS. 2 and 3 in the interest of clarity. It should be borne in mind, though, that the tubular net 2 extends about the carrier 4. Furthermore, the tubular net 2 is held on the carrier 4 by two closing bands 9 (FIG. 1). Each closing band 9 may comprise a strip of plastic foil, which extends through the interior of the carrier 4 in the direction of the axis 3. The band runs around the two face sides of the carrier 4 and the tubular net 2, so that the respective outer sides of the tubular net 2 are also enclosed. Of course, the two ends of each plastic strip of the closing bands are connected to each other, e.g. by welding. This kind of closing band is known in the art. The plastic closing bands may be replaced by two strings, which pass through the interior of the carrier 4 and over the respective outer side of the tubular net 2 in the manner described above.

The closing bands 9 usually extend over both a larger area 6 and a smaller area 7 of the carrier 4, so that it is necessary to remove the closing bands 9 from the planting net before setting up the carrier with the tubular net. If the closing bands 9 are arranged parallel to only the larger area 6 of the rectangular shape, they add to the stability of the larger areas and aid in the setup of the net. It then becomes possible to open or remove the closing bands after putting the opened planting net onto the net carrier of the planting machine.

Figure 3:
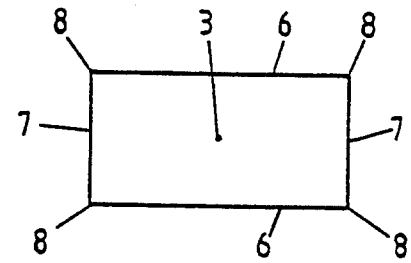
FIG. 3 is a face view of the carrier in the opened state.

The planting net 1 is manufactured equipped as shown in FIG. 1 and delivered to the user. The user removes the two closing bands 9 before mounting the net onto the net carrier of the planting machine. The planting net 1 is set up with the carrier 4 and the tubular net 2 as shown in FIG. 3. The carrier 4, in the opened position, together with the tubular net 2 is pushed onto the net carrier of the planting machine during the setup. From there the tubular net is fed off the planting machine, moving across the field into the soil while the flower bulbs are put into the inside of the tubular net.

Figure 4:
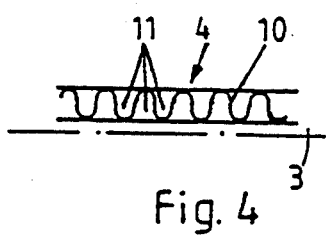
FIG. 4 is a cut through a part of the carrier parallel to the direction of the axis of the tubular net.
Figure 5:
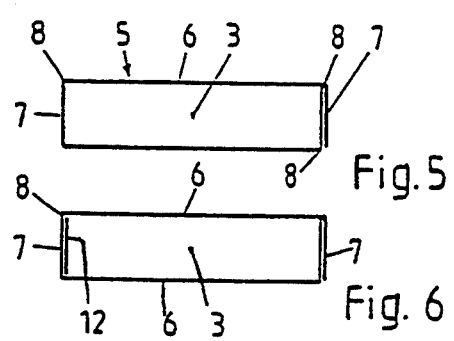
FIG. 5 is a face view of another carrier in the opened state.

Particularly with the relatively wide tubular nets 2 with a width of more than 1 m, it is sensible to form the larger areas 6 so stably that they do not bend unwantedly when setting up the tubular net. It has been found that a good way to improve the net s transverse stability is by the use of corrugated board, and by the arrangement of the flute 10 (FIG. 4) of the board parallel to the direction of the axis 3. The tubes 11 formed between the flute 10 and the covering layers then extend perpendicular to the direction of the axis 3 corresponding to the width of the tubular net 2.

Figure 6:
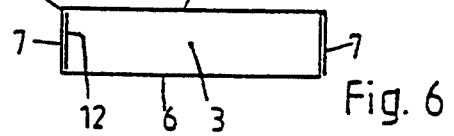
FIG. 6 is a face view of another carrier of the present invention in the opened state.

Further measures to improve the stability especially of the larger areas 6, but also of the smaller areas 7 are depicted in FIGS. 5–8. According to FIG. 5, the cutting 5 of the carrier 4 is made longer by one smaller area 7, so that the smaller area 7 appears as a double layer. The connection can also be made here, especially by gluing of the material of the carrier 4. FIG. 6 shows an embodiment which has a double layer at both smaller areas 7. To this end an insert 12 is provided at the other smaller area, which may be glued or tacked to the continuous material of the cutting 5. The ring-shaped closure of the cutting 5 may also be accomplished by tacking.

Figure 7:
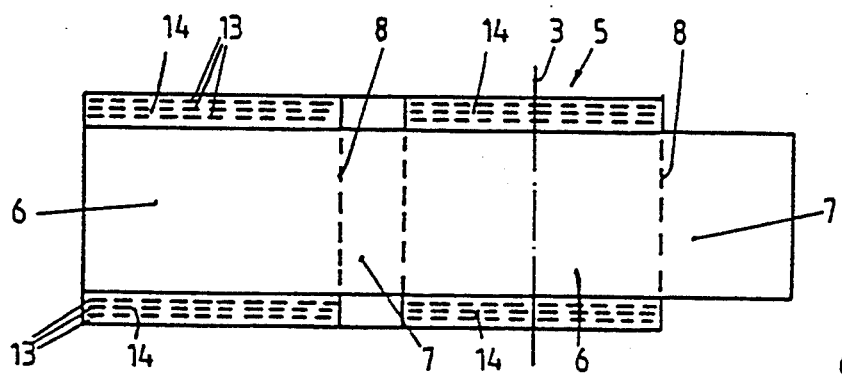
FIG. 7 is a plan view of a cutting of carton, cardboard or the like for the formation of a carrier.
Figure 8:
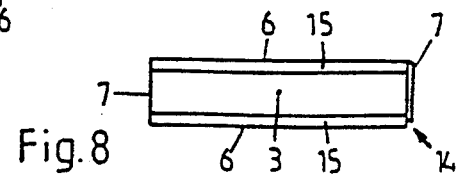
FIG. 8 is a face view of the carrier formed from the cutting according to FIG. 7.

The carrier 4 shown in face view and in the opened state in FIG. 8 may be formed from the cutting 5 pictured in FIG. 7. The exceptional feature in this embodiment is that sections 14 with grooves 13, which can be rolled up perpendicular to the direction of the axis 3 to form tubular objects, are provided on the side regions of the larger areas 6, so that ultimately reinforcements 15 are formed. These reinforcements 15 act to prevent an unwanted bending of the larger areas 6. This is especially the case when the larger areas 6 are formed to be much wider than the smaller areas 7. Such a shaping of the net carrier of the planting machine is sensible in order to make use of the greatest possible width of the net.

While embodiments and applications of this invention have been shown and described, it should be apparent to those skilled in the art that many more modifications are possible without departing from the scope of the present invention. The invention is therefore not to be restricted, except in the spirit of the appended claims.

What is claimed is:

1. A gathered planting net for the cultivation of flower bulbs, said planting net being adapted for mounting on a planting machine including a net carrier, said planting net including:
   a carrier lying flat in a transport state and a tubular net provided thereon, said tubular net held on the carrier with at least one closing band, wherein the closing band penetrates the interior of the tubular net and of the carrier in the direction of an axis of the tubular net, said closing band extending over the outside of the tubular net,
   said carrier comprising a ring-shaped cutting of flexible material having folds parallel to the direction of the axis of the tubular net for setting up the carrier with the tubular net provided thereon and for mounting the carrier in an opened state onto the net carrier of the planting machine.

2. A gathered planting net mountable on a plating machine including a net carrier, said plating net including:
   a carrier lying flat in a transport state capable of being opened into an opened state and a tubular net provided thereon, said tubular net held on the carrier with at least one closing band, said closing band extending over the outside of the tubular net,
   said carrier comprising a ring-shaped cutting of flexible material having folds parallel to the direction of the axis of the tubular net for mounting the carrier in an opened state onto the net carrier of the planting machine.

3. The planting net of claim 1, wherein the folds are distributed over the circumference of the ring-shaped cutting so that a rectangular shape is obtained when opening the carrier and the tubular net.

4. The planting net according to claim 3, wherein the cutting comprises corrugated board and the direction of the flute of said board is arranged parallel to the direction of the axis of the tubular net.

5. The planting net according to claim 3, wherein the ring-shaped cutting is provided in two layers in an area between said folds.

6. The planting net according to claim 3, wherein the ring-shaped cutting is provided with inserts in an area between said folds.

7. The planting net according to claim 3, wherein the free edges of the ring-shaped cutting are sectionally provided with reinforcements.

8. The planting net according to claim 3, wherein said ring-shaped cutting further includes a larger and a smaller area of rectangular shape, and the closing bands are arranged parallel to the larger area of rectangular shape.

9. The planting net according to claim 1, wherein the cutting comprises corrugated board and the direction of the flute of said board is arranged parallel to the direction of the axis of the tubular net.

10. The planting net according to claim 1, wherein the ring-shaped cutting is provided in two layers in an area between said folds.

11. The planting net according to claim 1, wherein the ring-shaped cutting is provided with inserts in an area between said folds.

12. The planting net according to claim 1, wherein the free edges of the ring-shaped cutting are sectionally provided with reinforcements.

13. A planting net capable of being set up on a planting machine, for cultivating flower bulbs, said planting net comprising:
   a tubular net;
   a carrier comprising a continuous cutting of flexible material having a plurality of folds, said carrier situated inside said tubular net, said carrier expandable from a closed position to an open position, said folds on said carrier allowing the rapid setup of said net on said planting machine.

* * * * *